US012078151B2

(12) United States Patent
Barton et al.

(10) Patent No.: US 12,078,151 B2
(45) Date of Patent: Sep. 3, 2024

(54) WIND TURBINE AND METHOD OF OPERATING A WIND TURBINE

(71) Applicant: General Electric Renovables Espana, S.L., Barcelona (ES)

(72) Inventors: Werner Gerhard Barton, Salzbergen (DE); Parag Rameshchandra Dharmadhikari, Garching b. München (DE)

(73) Assignee: General Electric Renovables España S.L., Barcelona (ES)

( * ) Notice: Subject to any disclaimer, the term of this patent is extended or adjusted under 35 U.S.C. 154(b) by 24 days.

(21) Appl. No.: 17/982,850

(22) Filed: Nov. 8, 2022

(65) Prior Publication Data

US 2023/0147903 A1 May 11, 2023

(30) Foreign Application Priority Data

Nov. 10, 2021 (EP) .................................... 21207505

(51) Int. Cl.
*F03D 7/02* (2006.01)
*F03D 9/25* (2016.01)

(52) U.S. Cl.
CPC ........... *F03D 7/0284* (2013.01); *F03D 9/255* (2017.02); *F05B 2270/1016* (2013.01); *F05B 2270/327* (2013.01); *F05B 2270/332* (2013.01)

(58) Field of Classification Search
CPC ........ F03D 7/0284; F03D 9/255; F03D 80/40; F03D 7/0272; F03D 9/25; F03D 7/042;

(Continued)

(56) References Cited

U.S. PATENT DOCUMENTS 8,038,397 B2 10/2011 Saddoughi et al.
8,522,522 B2 9/2013 Poisson
(Continued)

FOREIGN PATENT DOCUMENTS

EP 3015707 A1 5/2016
EP 3048296 A1 7/2016
(Continued)

OTHER PUBLICATIONS

European Search Report Corresponding to EP21207505 on Apr. 8, 2022.

*Primary Examiner* — Joseph Ortega
(74) *Attorney, Agent, or Firm* — Dority & Manning, P.A.

(57) ABSTRACT

A wind turbine and operating method include a double-fed induction generator with a generator rotor and a generator stator, a power conversion assembly having respective rotor-side and line-side power converters, and a load. The generator rotor is coupled to the rotor-side power converter. The line-side power converter and the load are coupled to a grid via a low voltage winding of a transformer. A first sum of a rated current of the generator rotor and a rated current of the load is more than an upper current limit of the low voltage winding. When operating the generator at a sub-synchronous speed, a first current is provided to the generator rotor that is less than a normal generator rotor current, and a second current is provide to the load, wherein a second sum of the first current and the second current is equal to or less than the upper current limit of the low voltage winding.

15 Claims, 6 Drawing Sheets

(58) Field of Classification Search
CPC .......... F03D 7/048; F03D 9/257; F03D 80/60; F05B 2270/1016; F05B 2270/327; F05B 2270/332; F05B 2270/502; H02J 2300/28; H02J 3/381; H02J 3/466; Y02E 10/72; H02P 9/007; H02P 9/02
See application file for complete search history.

(56) References Cited

U.S. PATENT DOCUMENTS

| | | |
|---|---|---|
| 8,667,774 B2 | 3/2014 | Kuehn et al. |
| 9,321,536 B2 | 4/2016 | Snir et al. |
| 9,698,651 B2 | 7/2017 | De Wergifosse et al. |
| 9,941,687 B2 | 4/2018 | Zhu et al. |
| 9,970,300 B2 | 5/2018 | Perkinson |
| 10,183,754 B1 | 1/2019 | Agarwal et al. |
| 10,233,908 B2 | 3/2019 | Draper |
| 10,309,250 B2 | 6/2019 | Herbaut et al. |
| 10,427,798 B2 | 10/2019 | Snir et al. |
| 10,457,403 B2 | 10/2019 | Houlihan et al. |
| 10,458,396 B2 | 10/2019 | Philipsen et al. |
| 10,465,091 B2 | 11/2019 | Tuteja et al. |
| 10,472,977 B2 | 11/2019 | Zhao et al. |
| 10,479,511 B2 | 11/2019 | Bourne et al. |
| 10,502,192 B2 | 12/2019 | Zhao et al. |
| 10,710,732 B2 | 7/2020 | Aubert et al. |
| 10,830,215 B2 | 11/2020 | Zhao et al. |
| 10,871,151 B2 | 12/2020 | Taillade et al. |
| 11,396,844 B2 | 7/2022 | Mizuno et al. |
| 2013/0026757 A1 | 1/2013 | Peters et al. |
| 2014/0346774 A1 | 11/2014 | Cooper |
| 2016/0118786 A1* | 4/2016 | Zhu .................. H02H 7/067 290/44 |
| 2016/0221680 A1 | 8/2016 | Burton et al. |
| 2016/0236787 A1 | 8/2016 | Bourne et al. |
| 2017/0260969 A1 | 9/2017 | Zhao et al. |
| 2017/0314536 A1 | 11/2017 | Zhao et al. |
| 2018/0127616 A1 | 5/2018 | Tuteja et al. |
| 2018/0187561 A1 | 7/2018 | Zhao et al. |
| 2018/0346135 A1 | 12/2018 | Haldeman et al. |
| 2019/0084682 A1 | 3/2019 | Aubert et al. |
| 2019/0193863 A1 | 6/2019 | Abdollahzadehsangroudi et al. |
| 2019/0264658 A1 | 8/2019 | Li et al. |
| 2020/0018293 A1 | 1/2020 | Taillade et al. |
| 2020/0047215 A1 | 2/2020 | Pachai et al. |
| 2020/0088172 A1 | 3/2020 | Scholte-Wassink |
| 2020/0124032 A1 | 4/2020 | Grunnet et al. |
| 2020/0232445 A1 | 7/2020 | Lindskog |
| 2020/0263671 A1 | 8/2020 | Xing |
| 2020/0370540 A1 | 11/2020 | Arlaban Gabeiras et al. |
| 2021/0017395 A1 | 1/2021 | Palumbo et al. |
| 2021/0395588 A1 | 12/2021 | Anand et al. |

FOREIGN PATENT DOCUMENTS

| | | |
|---|---|---|
| EP | 3096008 A1 | 11/2016 |
| EP | 3231252 B1 | 12/2018 |
| EP | 3486479 A1 | 5/2019 |
| EP | 3567244 A1 | 11/2019 |
| EP | 3011172 B1 | 8/2020 |
| WO | WO2016037476 A1 | 3/2016 |
| WO | WO2016065807 A1 | 5/2016 |
| WO | WO2016091882 A1 | 6/2016 |
| WO | WO2017028843 A1 | 2/2017 |
| WO | WO2017190747 A1 | 11/2017 |
| WO | WO2018063529 A1 | 4/2018 |
| WO | WO2018109016 A1 | 6/2018 |
| WO | WO2018143860 A1 | 8/2018 |
| WO | WO2019/001667 A1 | 1/2019 |
| WO | WO2019091055 A1 | 5/2019 |
| WO | WO2019144981 A1 | 8/2019 |
| WO | WO2019233251 A1 | 12/2019 |
| WO | WO2020038342 A1 | 2/2020 |
| WO | WO2020082652 A1 | 4/2020 |

\* cited by examiner

WIND TURBINE AND METHOD OF OPERATING A WIND TURBINE

The present disclosure relates generally to wind turbines and, more particularly, to method of operating a wind turbine and apparatus for operating a wind turbine.

BACKGROUND

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent and/or different operating limitations, such as current, voltage, power, temperature and other limits, than other components. Moreover, known wind turbines typically are designed and/or assembled with predefined limits. To operate within such limits, the electrical and/or mechanical components may be operated based on certain decisions. Depending on the decisions, less or more desirable outcomes may result. The subject-matter described herein, is intended to address at least some of the challenges of working with operating limits for achieving desirable outcomes.

BRIEF DESCRIPTION

Aspects and advantages of the invention will be set forth in part in the following description, or may be obvious from the description, or may be learned through practice of the invention.

According to an aspect, there is provided a method of operating a wind turbine, the wind turbine including a double-fed induction generator having a generator stator and a generator rotor, a power conversion assembly including a rotor-side power converter and a line-side power converter, and a load, wherein the generator rotor is electrically coupled to the rotor-side power converter, wherein the line-side power converter and the load are electrically coupled to a grid via a low voltage winding of a transformer, and wherein a first sum of a rated current of the generator rotor and a rated current of the load is more than an upper current limit of the low voltage winding, the method including: when operating the generator at a sub-synchronous speed, providing a first current to the generator rotor, the first current being less than a normal generator rotor current, and providing a second current to the load, wherein a second sum of the first current and the second current is equal to or less than the upper current limit of the low voltage winding.

According to a further aspect, there is provided a method of operating a wind turbine, the wind turbine including a blade, a blade heating system, a double-fed induction generator having a generator stator and a generator rotor, a power conversion assembly including a rotor-side power converter and a line-side power converter, and a load, wherein the generator rotor is electrically coupled to the rotor-side power converter, wherein the line-side power converter and the load are electrically coupled to a grid via a low voltage winding of a transformer, and wherein a first sum of a rated current of the generator rotor and a rated current of the load is more than an upper current limit of the low voltage winding, the method including: determining ice is on the blade, determining a current wind speed, when the determined current wind speed is less than a cut-in wind speed, providing, to the blade heating system, a current up to a rated current of the blade heating system, and when the determined current wind speed is equal to or more than the cut-in wind speed and when the generator is at sub-synchronous speed, providing, to the blade heating system, a current up to a lower one of an unused current capacity of the low voltage winding and the rated current of the blade heating system.

According to another aspect, there is provided a wind turbine including: a blade, a double-fed induction generator having a generator stator and a generator rotor, a power conversion assembly including a rotor-side power converter and a line-side power converter, a load, and a controller, wherein the generator rotor is electrically coupled to the rotor-side power converter, wherein the line-side power converter and the load are electrically coupled to a grid via a low voltage winding of a transformer, and wherein a first sum of a rated current of the generator rotor and a rated current of the load is more than an upper current limit of the low voltage winding, wherein the controller is configured to perform the following: when the generator is at sub-synchronous speed, provide, by the rotor-side power converter, a first current to the generator rotor, the first current being less than a normal generator rotor current, and provide a second current to the load, wherein a second sum of the first current and the second current is equal to or less than the upper current limit of the low voltage winding.

According to yet further aspect, there is provided a computer-readable storage medium including instructions which, when executed by a computer, cause the computer to carry out the method according to an aspect described herein.

These and other aspects, embodiments, examples and advantages of the present invention will become better understood with reference to the following description and appended claims.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
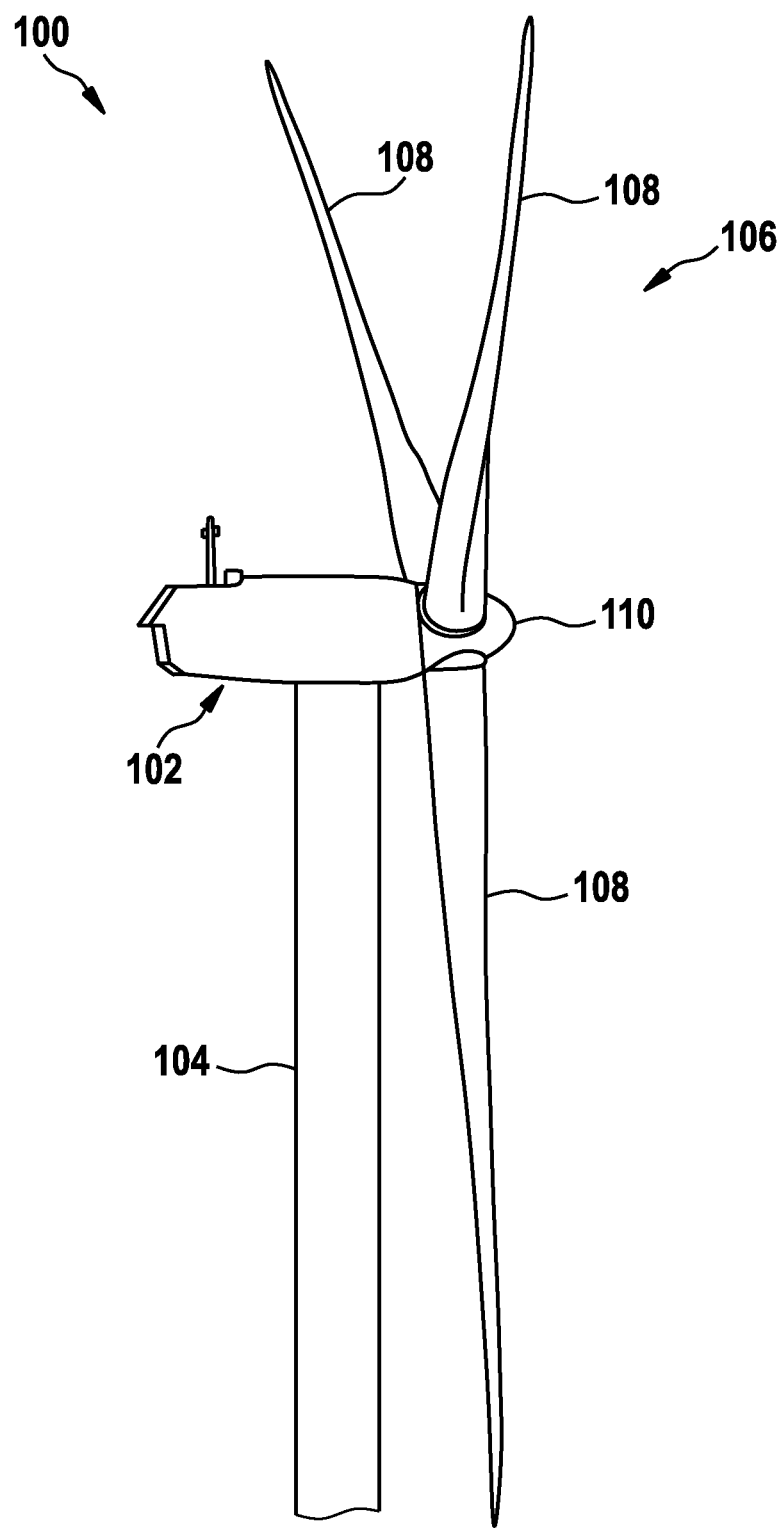
FIG. 1 is a perspective view of a wind turbine according to embodiments described herein.

Reference now will be made in detail to embodiments, one or more examples of which are illustrated in the drawings. Each example is provided for explaining the present disclosure. Features illustrated or described as part of one example or embodiment can be used with another example or embodiment.

As discussed above, the present disclosure relates to wind turbines and, more particularly, to method of operating a wind turbine and apparatus for operating a wind turbine. In general, any component in an electrical system of a wind turbine may be a bottleneck or limiting component.

For example, the slip ring of the generator may be a limiting component, for example, in terms of maximum current or power that can be drawn or provided by the electrical system. In another example, a transformer may be a limiting component, for example, a transformer between a distribution or collection grid and an individual wind turbine (or a group of wind turbines). For example, when current or power demands exceed a transformer rating, the demanded current or power cannot be drawn or provided.

Generally, more than one electrical system or load can be electrically coupled to the same winding of the transformer. For example, rotor windings of a double fed induction generator (DFIG) may be electrically coupled to the same low voltage winding of the transformer as an electrical load, such as a yaw system or an ice management system. When wind speeds are low, the rotor windings may consume power. When conditions are icy, the ice management system, such as a blade heating system may also consume power.

Accordingly, demanded current or power through the low voltage winding of the transformer may exceed a transformer rating, e.g. a maximum current rating of the low voltage winding.

Accordingly, a transformer may be a bottleneck or limiting component, for example, in terms of maximum current or power that can be drawn by or provided to rotor windings and blade heating system at the same time.

For addressing such a bottleneck, the transformer may be specified or upgraded appropriately. In case the transformer is specified or upgraded such as to simultaneously handle a maximum current or power demand of all power consumers, e.g. generator rotor and ice management system, such a transformer would generally be very large and expensive, that is generally space- and cost-ineffective.

In general, some components are more costly or more difficult to up-spec (up-rate) or upgrade than others. In the above examples, the transformer would generally be a more expensive component to upgrade than a slip ring, and/or more difficult to upgrade, for example, when the supporting frame has limited space or when available cooling is limited.

As an example, a transformer system typically involves a plurality of aspects such as grid side interface, impedance, arc flash, protection coordination, busbar, main fuse, and cooling, which contribute to the (cascading) cost and complexity of up-specifying or up-rating. As described herein, the transformer may be understood as the main transformer.

Accordingly, it is advantageous if the effectiveness of the system can be improved without involving an overly large and/or expensive transformer. In general, current or power is drawn by or provided to the rotor windings during sub-synchronous speed operation of the generator. Generally, a normal generator rotor current setpoint is set such as to maximize power production (for a current wind speed) within other considerations, such as grid side demands, mechanical loading limit(s), and/or (pre-determined) acoustic noise generation limit(s).

In general, a current or power demand of a load such a yaw system or an ice management system can be substantial. In particular, longer blades and/or harsher ambient conditions imposes increasing added load demands. Additionally, the current or power demands may be transitional and/or time-sensitive.

Accordingly, when a load and rotor windings are electrically coupled to the same low voltage winding of the transformer, and a total current demand of the rotor windings and the load exceeds a current rating of the low voltage winding, a current provided to the rotor windings may be reduced, in order to provide a demanded current to the load, such as to operate near or at an upper current limit of the low voltage winding.

In view of the above, it can be understood that generally there is a large number of operational conditions, where for each operational condition, there is a respective limiting condition, and for each limiting condition, a respective limiting component. Accordingly, the present disclosure provides beneficial insight, for improving the effectiveness of the system, to address the transformer as a limiting component. In particular, it is identified to address the low voltage winding of the transformer that is electrically coupled to rotor windings and a load.

The present disclosure provides further beneficial insight, for improving the effectiveness of the system, to control the current or power supplied to the rotor windings and the load, such as to operate within the upper current limit of the low voltage winding, thus improving an effectiveness of the system without involving an overly large and/or expensive transformer. The advantages are provided for both retrofit and new build applications.

In view of the above, the methods and apparatuses according to aspects, examples and embodiments described or illustrated herein enables the person of ordinary skill in the art to achieve at least some of the above described advantages.

Wind Turbine

FIG. 1 is a perspective view of a wind turbine 100 according to embodiments described herein. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106. The rotor 106 may include three blades 108 attached to a rotating hub 110. Alternatively, wind turbine 100 may include any number of blades 108 that facilitates operation of wind turbine 100 as described herein. The wind turbine 100 may include a gearbox (not shown in FIG. 1) operatively coupled to rotor 106 and a generator (not shown in FIG. 1).

According to an aspect, a wind turbine 100 includes a blade 108, a double-fed induction generator 118 having a generator stator 120 and a generator rotor 122, a power conversion assembly 210 including a rotor-side power converter 220 and a line-side power converter 222, a load 340, and a controller, wherein the generator rotor 122 is electrically coupled to the rotor-side power converter 220, wherein the line-side power converter 222 and the load 340 are electrically coupled to a grid 390 via a low voltage winding 310 of a transformer 234, and wherein a first sum of a rated current of the generator rotor 122 and a rated current of the load 340 is more than an upper current limit of the low voltage winding 310.

According to the aspect, the controller is configured to perform the following: when the generator 118 is at sub-synchronous speed, provide, by the rotor-side power converter 220, a first current to the generator rotor 122, the first current being less than a normal generator rotor current, and provide a second current to the load 340, wherein a second sum of the first current and the second current is equal to or less than the upper current limit of the low voltage winding 310.

According to an aspect, a computer-readable storage medium comprising instructions which, when executed by a computer, cause the computer to carry out a method according to aspects, embodiments and examples described herein.

Electrical and Control System

Figure 2:
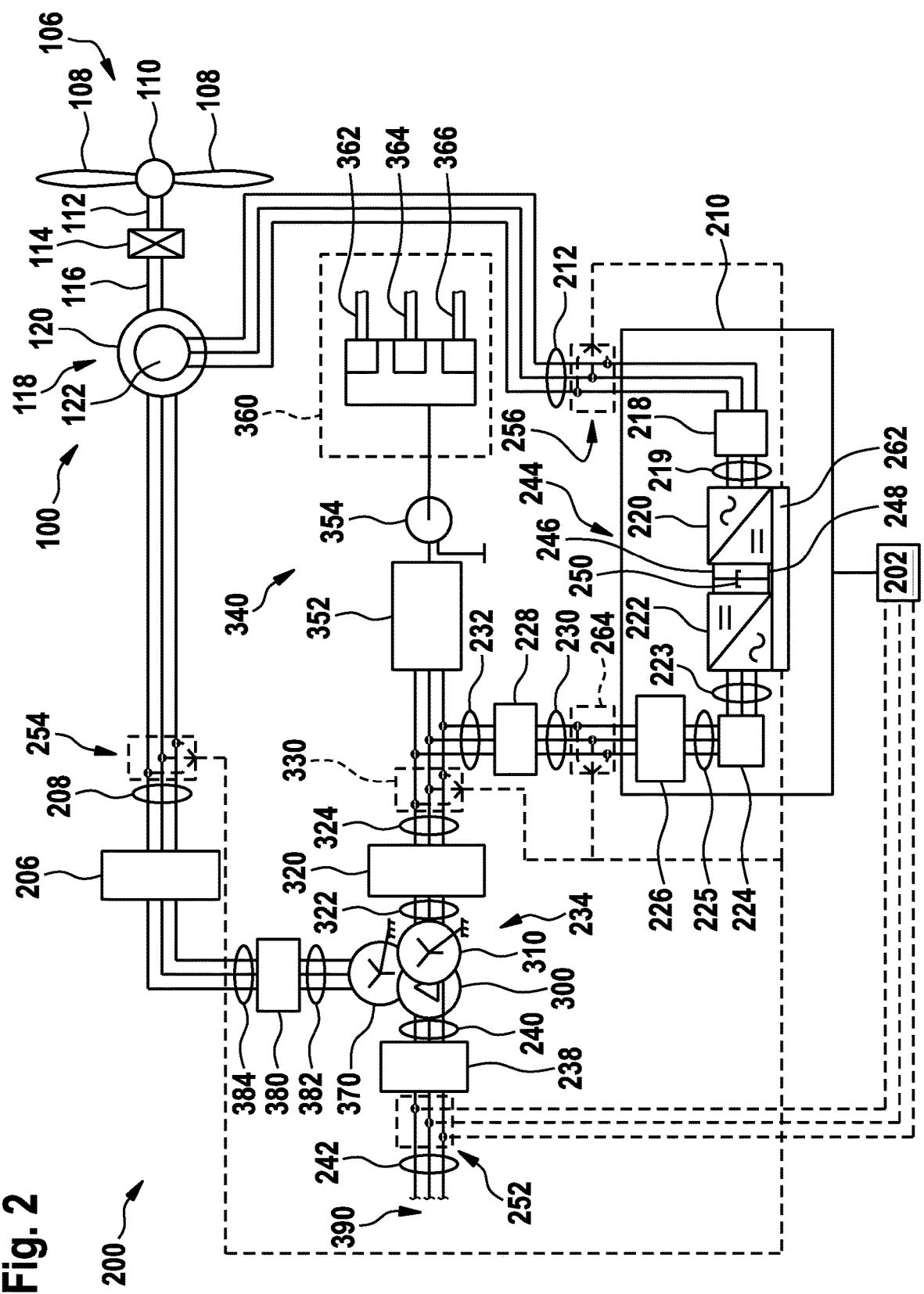
FIG. 2 is a schematic view of an electrical and control system of a wind turbine according to embodiments described herein.

FIG. 2 is a schematic view of an electrical and control system 200 that may be used with wind turbine 100 according to embodiments described herein. According to embodiments, the rotor 106 includes blades 108 coupled to hub 110. According to embodiments, rotor 106 includes a low-speed shaft 112 rotatably coupled to hub 110. According to embodiments, low-speed shaft 112 is coupled to a step-up gearbox 114 that is configured to step up the rotational speed of low-speed shaft 112 and transfer that speed to a high-speed shaft 116.

In an example, gearbox 114 has a step-up ratio of approximately 70:1. In an example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 may have any suitable step-up ratio that facilitates operation of wind turbine 100 as described herein. As a further alternative, wind turbine 100 may include a direct-drive generator that is rotatably coupled to rotor 106 without any intervening gearbox.

According to embodiments, high-speed shaft 116 is rotatably coupled to generator 118. The generator 118 is double-fed induction generator (DFIG) includes a generator stator 120 and a generator rotor 122. According to embodiments, generator 118 is a wound rotor, three-phase, asynchronous generator where the generator stator 120 is magnetically coupled to a generator rotor 122. It can be understood that a generator rotor can generally have a plurality of permanent magnets in place of rotor windings.

According to embodiments, electrical and control system 200 includes a turbine controller 202. Turbine controller 202 may include at least one processor and a memory, at least one processor input channel, at least one processor output channel, and/or at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein.

According to embodiments, memory may include, but is not limited to, a computer-readable medium, such as a random access memory (RAM) (none shown in FIG. 2). In an example, one or more storage devices, such as a floppy disk, a compact disc read only memory (CD-ROM), a magneto-optical disk (MOD), and/or a digital versatile disc (DVD) (none shown in FIG. 2) may be used. In an example, additional input channels (not shown in FIG. 2) may be, but are not limited to, computer peripherals associated with an operator interface such as a mouse and a keyboard (neither shown in FIG. 2). In an example, additional output channels may include, but are not limited to, an operator interface monitor (not shown in FIG. 2).

According to embodiments, processors for turbine controller 202 process information transmitted from a plurality of electrical and electronic devices that may include, but are not limited to, voltage and current transducers. In an example, RAM and/or storage devices store and transfer information and instructions to be executed by the processor. In an example, RAM and/or storage devices can be used to store and provide temporary variables, static (i.e., non-changing) information and instructions, or other intermediate information to the processors during execution of instructions by the processors. In an example, instructions that are executed include, but are not limited to, resident conversion and/or comparator algorithms. In an example, the execution of sequences of instructions is not limited to any specific combination of hardware circuitry and software instructions.

According to embodiments, generator stator 120 is electrically coupled to a stator synchronizing switch 206 via a stator bus 208. In an example, to facilitate the DFIG configuration, generator rotor 122 is electrically coupled to a bi-directional power conversion assembly 210 via a rotor bus 212. In an example, generator rotor 122 is electrically coupled to rotor bus 212 via any other device that facilitates operation of electrical and control system 200 as described herein. In an example, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly may facilitate channeling electric power between generator stator 120 and an electric power transmission and distribution grid (not shown).

According to embodiments, stator bus 208 transmits three-phase power from generator stator 120 to stator synchronizing switch 206. In an example, rotor bus 212 transmits three-phase power from generator rotor 122 to power conversion assembly 210. In an example, stator synchronizing switch 206 is electrically coupled to a first main transformer circuit breaker 380 via a stator side system bus 384. In an example, one or more fuses (not shown) are used instead of first main transformer circuit breaker 380. In an example, neither fuses nor first main transformer circuit breaker 380 is used.

According to embodiments, power conversion assembly 210 includes a rotor filter 218 that is electrically coupled to generator rotor 122 via rotor bus 212. In an example, rotor filter bus 219 electrically couples rotor filter 218 to a rotor-side power converter 220. In an example, rotor-side power converter 220 is electrically coupled to line-side power converter 222. In an example, rotor-side power converter 220 and line-side power converter 222 are power converter bridges including power semiconductors (not shown). In an example, rotor-side power converter 220 and line-side power converter 222 are configured in a three-phase, pulse width modulation (PWM) configuration including insulated gate bipolar transistor (IGBT) switching devices (not shown in FIG. 2). In an example, rotor-side power converter 220 and line-side power converter 222 have any configuration using any switching devices that facilitate operation of electrical and control system 200 as described herein. In an example, power conversion assembly 210 is coupled in electronic data communication with turbine controller 202 to control the operation of rotor-side power converter 220 and line-side power converter 222.

According to embodiments, a line-side power converter bus 223 electrically couples line-side power converter 222 to a line filter 224. In an example, a line bus 225 electrically couples line filter 224 to a line contactor 226. In an example, line contactor 226 is electrically coupled to a conversion circuit breaker 228 via a conversion circuit breaker bus 230. In an example, conversion circuit breaker 228 is electrically coupled to a second main transformer circuit breaker 320 via a second system bus 324 and a connection bus 232. In an example, line filter 224 is electrically coupled to rotor side system bus 324 directly via connection bus 232 and includes a protection scheme (not shown) configured to account for removal of line contactor 226 and conversion circuit breaker 228 from electrical and control system 200.

A transformer 234 or main transformer 234 or electric power main transformer 234 is provided. In an example, the transformer 234 is configured to provide a step-change of voltage between voltage of the generator 118, and voltage of the grid 390. The term "grid 390" may be understood as a collection/distribution network/grid.

The transformer 234 includes a low voltage winding 310 or a first low voltage winding 310. In an example, the transformer 234 includes a further low voltage winding 370 or a second low voltage winding 370. In an example, the low voltage winding 310 is arranged. In an example, rotor side main transformer circuit breaker 320 is electrically coupled to the electric power main transformer 234 via a rotor side generator side bus 322. In an example, stator side main transformer circuit breaker 380 is electrically coupled to the electric power main transformer 234 via a stator side generator side bus 382.

According to embodiments, main transformer 234 is electrically coupled to a grid circuit breaker 238 via a breaker-side bus 240. In an example, grid circuit breaker 238 is connected to the electric power transmission and distribution grid via a grid bus 242. In an example, main transformer 234 is electrically coupled to one or more fuses (not shown), rather than to grid circuit breaker 238, via breaker-side bus 240. In an example, neither fuses nor grid circuit breaker 238 is used and main transformer 234 is coupled to the electric power transmission and distribution grid via breaker-side bus 240 and grid bus 242.

According to embodiments, rotor-side power converter 220 is coupled in electrical communication with line-side power converter 222 via a single direct current (DC) link 244. In an example, rotor-side power converter 220 and line-side power converter 222 are electrically coupled via individual and separate DC links (not shown in FIG. 2). In an example, DC link 244 includes a positive rail 246, a negative rail 248, and at least one capacitor 250 coupled between positive rail 246 and negative rail 248. In an example, capacitor 250 includes one or more capacitors configured in series and/or in parallel between positive rail 246 and negative rail 248.

According to embodiments, turbine controller 202 is configured to receive a plurality of voltage and electric current measurement signals from a first set of voltage and electric current sensors 252. In an example, turbine controller 202 is configured to monitor and control at least some of the operational variables associated with wind turbine 100. In an example, each of three voltage and electric current sensors 252 are electrically coupled to each one of the three phases of grid bus 242. In an example, voltage and electric current sensors are electrically coupled to stator side system bus 384 and/or rotor side system bus 324. In an example, voltage and electric current sensors are electrically coupled to any portion of electrical and control system 200 that facilitates operation of electrical and control system 200 as described herein. In an example, turbine controller 202 is configured to receive any number of voltage and electric current measurement signals from any number of voltage and electric current sensors including, but not limited to, one voltage and electric current measurement signal from one transducer.

As shown in FIG. 2, electrical and control system 200 may include a converter controller 262 that is configured to receive a plurality of voltage and electric current measurement signals. According to embodiments, converter controller 262 receives voltage and electric current measurement signals from a second set of voltage and electric current sensors 254 coupled in electronic data communication with stator bus 208. In an example, converter controller 262 receives a third set of voltage and electric current measurement signals from a third set of voltage and electric current sensors 256 coupled in electronic data communication with rotor bus 212. In an example, converter controller 262 receives a fourth set of voltage and electric current measurement signals from a fourth set of voltage and electric current sensors 264 coupled in electronic data communication with conversion circuit breaker bus 230. The converter controller 262 receives voltage and electric current measurement signals from a set of voltage and electric current sensors 330 in electronic data communication with the rotor side system bus 324. In an example, second set of voltage and electric current sensors 254 is substantially similar to first set of voltage and electric current sensors 252. In an example, fourth set of voltage and electric current sensors 264 is substantially similar to third set of voltage and electric current sensors 256. In an example, converter controller 262 is substantially similar to turbine controller 202 and is coupled in electronic data communication with turbine controller 202. In an example, converter controller 262 is physically integrated within power conversion assembly 210. In an example, converter controller 262 has a configuration that facilitates operation of electrical and control system 200 as described herein.

During operation, wind impacts blades 108 and blades 108 transform wind energy into a mechanical rotational torque. According to embodiments, mechanical rotational torque rotatably drives low-speed shaft 112 via hub 110. In an example, low-speed shaft 112 drives gearbox 114 that subsequently steps up the low rotational speed of low-speed shaft 112 to drive high-speed shaft 116 at an increased rotational speed. In an example, high speed shaft 116 rotatably drives generator rotor 122. In an example, a rotating magnetic field is induced by generator rotor 122 and a voltage is induced within generator stator 120 that is magnetically coupled to generator rotor 122.

According to embodiments, generator 118 converts the rotational mechanical energy to a sinusoidal, three-phase alternating current (AC) electrical energy signal in generator stator 120. In an example, electrical power is transmitted to main transformer 234 via stator bus 208, stator synchronizing switch 206, stator side system bus 384, stator side main transformer circuit breaker 380 and stator side generator side bus 382. In an example, main transformer 234 steps up the voltage amplitude of the electrical power and the transformed electrical power is transmitted to a grid via breaker-side bus 240, grid circuit breaker 238 and grid bus 242.

According to embodiments, a second electrical power transmission path is provided. In an example, electrical, three-phase, sinusoidal, AC power is generated within generator rotor 122 and is transmitted to power conversion assembly 210 via rotor bus 212. In an example, within power conversion assembly 210, the electrical power is transmitted to rotor filter 218 and the electrical power is modified for the rate of change of the PWM signals associated with rotor-side power converter 220. In an example, rotor-side power converter 220 acts as a rectifier and rectifies the sinusoidal, three-phase AC power to DC power. In an example, DC power is transmitted into DC link 244. In an example, capacitor 250 facilitates mitigating DC link 244 voltage amplitude variations by facilitating mitigation of a DC ripple associated with AC rectification.

According to embodiments, DC power is transmitted from DC link 244 to line-side power converter 222. In an example, line-side power converter 222 acts as an inverter configured to convert the DC electrical power from DC link 244 to three-phase, sinusoidal AC electrical power with pre-determined voltages, currents, and frequencies. In an example, power conversion is monitored and controlled via converter controller 262. In an example, converted AC power is transmitted from line-side power converter 222 to rotor side system bus 324 via line-side power converter bus 223 and line bus 225, line contactor 226, conversion circuit breaker bus 230, conversion circuit breaker 228, and connection bus 232. In an example, line filter 224 compensates or adjusts for harmonic currents in the electric power transmitted from line-side power converter 222. In an example, stator synchronizing switch 206 is configured to close to facilitate connecting the three-phase power from generator stator 120 with the three-phase power from power conversion assembly 210.

According to embodiments, conversion circuit breaker 228, first main transformer circuit breaker 380, second main transformer circuit breaker 320, and grid circuit breaker 238 are configured to disconnect corresponding buses, for example, when excessive current flow may damage the components of electrical and control system 200. In an example, additional protection components are provided including line contactor 226, which may be controlled to form a disconnect by opening a switch (not shown in FIG. 2) corresponding to each line of line bus 225.

According to embodiments, power conversion assembly 210 compensates or adjusts the frequency of the three-phase power from generator rotor 122 for changes, for example, in the wind speed at hub 110 and blades 108. Accordingly, mechanical and electrical rotor frequencies can be decoupled from stator frequency.

According to embodiments, the bi-directional characteristics of power conversion assembly 210, and specifically, the bi-directional characteristics of rotor-side power converter 220 and line-side power converter 222, facilitate feeding back at least some of the generated electrical power into generator rotor 122. In an example, electrical power is transmitted from rotor side system bus 324 to connection bus 232. In an example, electrical power is transmitted through conversion circuit breaker 228 and conversion circuit breaker bus 230 into power conversion assembly 210.

According to embodiments, electrical power is transmitted through line contactor 226, line bus 225, and line-side power converter bus 223 into line-side power converter 222. In an example, line-side power converter 222 acts as a rectifier and rectifies the sinusoidal, three-phase AC power to DC power. In an example, DC power is transmitted into DC link 244. In an example, capacitor 250 facilitates mitigating DC link 244 voltage amplitude variations by facilitating mitigation of a DC ripple sometimes associated with three-phase AC rectification.

According to embodiments, DC power is transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. In an example, power conversion is monitored and controlled via converter controller 262. In an example, converted AC power is transmitted from rotor-side power converter 220 to rotor filter 218 via rotor filter bus 219. In an example, converted AC power is transmitted to generator rotor 122 via rotor bus 212, thereby facilitating sub-synchronous operation.

According to embodiments, power conversion assembly 210 is configured to receive control signals from turbine controller 202. In an example, control signals are based on sensed conditions or operating characteristics of wind turbine 100 and electrical and control system 200. In an example, control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner.

According to embodiments, for a grid voltage transient with predetermined characteristics, converter controller 262 will at least temporarily substantially suspend the IGBTs from conducting within line-side power converter 222. Such suspension of operation of line-side power converter 222 can substantially mitigate electric power being channeled through power conversion assembly 210 to approximately zero.

Low Voltage Winding

According to an aspect, the line-side power converter 222 and the load 340 are electrically coupled to a grid 390 via a low voltage winding 310 of a transformer 234. In an example, the low voltage winding 310 is a first low voltage winding 310. In an example, the low voltage winding 310 of the transformer 234 is a first low voltage winding 310 of a plurality of low voltage windings of the transformer 234.

According to embodiments, the generator stator 120 is electrically coupled to the grid 390 via a further low voltage winding 370 or a second low voltage winding 370 of the transformer 234. In an example, the further low voltage winding 370 or second low voltage winding 300 is different from the low voltage winding 310 or first low voltage winding 310.

According to embodiments, the transformer 234 includes the low voltage winding 310 (or first low voltage winding 310) and the further low voltage winding 370 (or second low voltage winding 370). In an example, the (main) transformer 234 includes the low voltage winding 310 (or first low voltage winding 310), and an auxiliary transformer (not shown) includes the further low voltage winding 370 (or second low voltage winding 370). In another example, the auxiliary transformer (not shown) includes the low voltage winding 310 and the main transformer 234 includes the further low voltage winding 370.

Generator Rotor

According to an aspect, the double-fed induction generator 118 includes a generator stator and a generator rotor 122. According to an aspect, generator rotor 122 is electrically coupled to rotor-side power converter 220. According to an aspect, power conversion assembly 210 includes the rotor-side power converter 220 and line-side power converter 222. According to an aspect, line-side power converter 222 and load 340 are electrically coupled to low voltage winding 310.

According to embodiments, the generator rotor has a rated current. In an example, a controller, e.g. generator controller or turbine controller, is configured to control a current provided to the generator rotor, e.g. when the generator is at sub-synchronous speed.

Loads

According to embodiments, the load 340 includes a blade heating system 360. In an example, the blade heating system 360 is part of an ice management system. In an example, the blade heating system 360 includes one or more heaters 362, 364, 366 arranged to heat a respective blade 108 of the wind turbine 100. In an example, the blade heating system 360 includes at least one heater arranged on each blade 108 of the wind turbine 100.

According to embodiments, the blade heating system 360 is electrically coupled to the low voltage winding 310 via switchgear equipment 352 and/or slip ring 354. In an example, the switchgear equipment 352 for the load 340 includes at least one of fuse module, lock-out-tag-out box, protection switchgear, and current transformer.

According to embodiments, one or more further loads (not shown) is/are electrically coupled to the grid 390 via the low voltage winding 310. One or more further loads can include for example, yaw system, gearbox system, pitch system, lubrication system, cooling system, electrical receptacles and lights, heaters and miscellaneous equipment. In an example, a further load, in particular, a yaw system, is electrically coupled to the grid 390 via the low voltage winding 310. In an example, the wind turbine 100 includes one or more of a yaw system, gearbox system, pitch system, lubrication system, cooling system, electrical receptacles and lights, heaters and miscellaneous equipment.

According to embodiments, the load 340 is electrically coupled to the grid 390 via a first tap on the low voltage winding 310. In an example, the one or more further loads (not shown) is/are electrically coupled to the grid 390 via a further tap on the low voltage winding 310. In an example, the further tap is different from the first tap. In an example, the load 340 is supplied power via the low voltage winding 310 at a first voltage. In an example, the one or more further loads is/are supplied power via the low voltage winding 310 at a second voltage. In an example, the first voltage and the second voltage are different. For illustrative purpose, the first voltage can be 690 V and the second voltage can be 400 V.

Normal Generator Rotor Current

According to embodiments, the normal generator rotor current is a generator rotor current for operating at one of a plurality of upper limit portions, or at a lowest upper limit portion of the plurality of upper limit portions, wherein the plurality of upper limit portions comprises an upper limit portion of possible power production of the wind turbine 100 at the current wind speed, an upper limit portion of mechanical loading of the wind turbine 100 and an upper limit portion of acoustic noise generation for the wind turbine 100.

According to embodiments, the normal generator rotor current is a generator rotor current for operating at an upper limit portion of possible power production of the wind turbine 100. An upper limit portion of possible power production of the wind turbine 100 may be understood to be for a current wind speed. In an example, an upper limit of possible power production is a power production corresponding to a maximum power coefficient for a current wind speed. In an example, a current wind speed is a calculated wind speed or a measured wind speed, or a modelled wind speed, for a current time, or for most recent calculation or measurement of wind speed available.

According to embodiments, the normal generator rotor current is a generator rotor current for operating at an upper limit portion of mechanical loading of the wind turbine 100. In an example, an upper limit of mechanical loading of the wind turbine 100 is based on a pre-determined and/or as-designed upper limit.

According to embodiments, the normal generator rotor current is a generator rotor current for operating at an upper limit portion of acoustic noise generation for the wind turbine 100. In an example, an upper limit of acoustic noise generation of the wind turbine 100 is based on a pre-determined and/or as-designed upper limit (e.g. based on pre-determined regulation limits).

In an example, an upper limit portion is a portion including the upper limit. In an example, an upper limit portion is a portion from 90% of the upper limit and higher, from 95% of the upper limit and higher, or from 99% of the upper limit and higher. In an example, an upper limit portion is up to the upper limit. In an example, an upper limit portion is a portion from a first threshold and higher. In an example, the first threshold is a fixed percentage of the upper limit. In an example, the first threshold is based on a controller speed or a control margin. In an example, an upper limit portion is a portion within 10%, 5% or 1% of the upper limit.

In an example, the normal generator rotor current is a generator rotor current for operating at a setpoint, the setpoint being one of upper limit portion of possible power production of the wind turbine 100 at a current wind speed, mechanical loading of the wind turbine 100 and acoustic noise generation for the wind turbine 100.

Upper Current Limit

According to embodiments, the low-voltage winding 310 includes an upper current limit. The upper current limit of the low voltage winding may be understood as a current capacity of the low voltage winding 310 or a maximum continuous current rating of the low voltage winding 310.

In an example, a second sum of the first current (that is being provided to the generator rotor 122) and the second current (that is being provided to the load 340) is (selected such as to be) equal to or less than the upper current limit of the low voltage winding 310.

According to embodiments, a difference between the second sum of the first current and the second current, and the upper current limit of the low voltage winding is less than 10% of the current capacity of the low voltage winding 310, less than 5% of the current capacity of the low voltage winding, less than an operational buffer of current capacity.

According to embodiments, a third current through the low voltage winding 310, the third current including the first current (that is being provided to the generator rotor 122) and the second current (that is being provided to the load 340) is (selected such as to be) substantially at the upper current limit of the low voltage winding 310. The term 'substantially' may be understood as 'within 10%', 'within 5%', 'within 2%', 'within a pre-determined margin' or 'within a fixed margin'.

Methods

Figure 3:
FIG. 3 is a block diagram of a method of operating a wind turbine according to an aspect described herein.

FIG. 3 is a block diagram of a method of operating a wind turbine according to aspects described herein. According to the aspect seen in FIG. 3, the method of operating a wind turbine includes, when operating the generator 118 at a sub-synchronous speed, providing a first current 410 to the generator rotor 122, the first current being less than a normal generator rotor current, and providing a second current 420 to the load 340, wherein a second sum of the first current and the second current is equal to or less than the upper current limit of the low voltage winding 310.

According to an aspect, wind turbine 100 includes a double-fed induction generator 118 having a generator stator 120 and a generator rotor 122, a power conversion assembly 210 including a rotor-side power converter 220 and a line-side power converter 222, and a load 340. According to an aspect, the generator rotor 122 is electrically coupled to the rotor-side power converter 220. According to an aspect, the line-side power converter 222 and the load 340 are electrically coupled to a grid 390 via a low voltage winding 310 of a transformer 234. According to an aspect a first sum of a rated current of the generator rotor 122 and a rated current of the load 340 is more than an upper current limit of the low voltage winding 310.

According to an aspect, a method of operating a wind turbine includes, when operating the generator 118 at a sub-synchronous speed, providing a first current 410 to the generator rotor 122, the first current being less than a normal generator rotor current, and providing a second current 420 to the load 340, wherein a second sum of the first current and the second current is equal to or less than the upper current limit of the low voltage winding 310.

It may be understood that providing the first current 410 to the generator rotor 122 and providing the second current 420 to the load 340 may be performed at (substantially) the same time or concurrently.

It may be understood that a controller(s), such as (one or more of) a turbine controller, converter controller, power conversion assembly controller, generator controller, and/or wind farm controller may be configured to issue a setpoint to the power conversion assembly 210 (and/or to the rotor-side power converter 220) to provide a first current 410 to the generator rotor 122.

It may be understood that a controller(s), such as (one or more of) a load controller, blade heating system controller, turbine controller, and/or wind farm controller may be configured (to control the load 340 or the blade heating system 360) to draw a second current 420.

Figure 4:
FIG. 4 is a block diagram of a method of operating a wind turbine according to embodiments described herein.

FIG. 4 is a block diagram of a method of operating a wind turbine according to embodiments described herein. According to the embodiment seen in FIG. 4, a method of operating a wind turbine includes drawing a third current 510 through the low-voltage winding 310.

According to embodiments, a method of operating a wind turbine includes drawing a third current 510 through the low-voltage winding 310, the third current including the first current and the second current, wherein the third current is substantially at the upper current limit of the low voltage winding 310.

In an example, the second sum of the first current and the second current is at least 50%, at least 70%, or at least 90% of the third current.

It may be understood that drawing a third current 510 through the low-voltage winding 310 may be performed (or may be effected by a controller) concurrently with providing the first current 410 to the generator rotor 122 and providing the second current 420 to the load 340.

It may be understood that a controller(s), such as (one or more of) a load controller, blade heating system controller, turbine controller, and/or wind farm controller may be configured (to control the load 340 or the blade heating system 360) to draw a third current 510 through the low-voltage winding 310.

Figure 5:
FIG. 5 is a block diagram of a method of operating a wind turbine according to embodiments described herein.

FIG. 5 is a block diagram of a method of operating a wind turbine according to embodiments described herein. According to the embodiment seen in FIG. 5, a method of operating a wind turbine includes determining 610 that setting a first generator rotor current setpoint to be the normal generator rotor current or setting a second load current setpoint to be the second current results in drawing a fourth current via the low voltage winding 310, the fourth current being more than the upper current limit of the low voltage winding 310.

According to the embodiment seen in FIG. 5, the method of operating a wind turbine includes determining 620 a first difference between the first generator rotor current setpoint and a preceding generator rotor current setpoint, or a second difference between the second load current setpoint and a preceding load current setpoint, is more than a third difference between the upper current limit of the low voltage winding 310 and a current already being drawn via the low voltage winding 310.

According to embodiments, a method of operating a wind turbine includes, prior to providing the first current 410 to the generator rotor 122 and prior to providing the second current 420 to the load 340, determining 610 that setting a first generator rotor current setpoint to be the normal generator rotor current or setting a second load current setpoint to be the second current results in drawing a fourth current via the low voltage winding 310, the fourth current being more than the upper current limit of the low voltage winding 310.

According to embodiments, a method of operating a wind turbine includes, determining 620 a first difference between the first generator rotor current setpoint and a preceding generator rotor current setpoint, or a second difference between the second load current setpoint and a preceding load current setpoint, is more than a third difference between the upper current limit of the low voltage winding 310 and a current already being drawn via the low voltage winding 310.

It may be understood that a controller(s), such as (one or more of) a load controller, blade heating system controller, converter controller, power conversion assembly controller, generator controller, turbine controller, and/or wind farm controller may be configured to determine 610 that setting a first generator rotor current setpoint to be the normal generator rotor current or setting a second load current setpoint to be the second current results in drawing a fourth current via the low voltage winding 310.

It may be understood that a controller(s), such as (one or more of) a load controller, blade heating system controller, converter controller, power conversion assembly controller, generator controller, turbine controller, and/or wind farm controller may be configured to determine 620 a first difference between the first generator rotor current setpoint and a preceding generator rotor current setpoint, or a second difference between the second load current setpoint and a preceding load current setpoint, is more than a third difference between the upper current limit of the low voltage winding 310 and a current already being drawn via the low voltage winding 310.

Figure 6:
FIG. 6 is a block diagram of a method of operating a wind turbine according to embodiments described herein.

FIG. 6 is a block diagram of a method of operating a wind turbine according to embodiments described herein. According to the embodiment seen in FIG. 6, a method of operating a wind turbine includes determining 710 that the normal generator rotor current is already being provided to the generator rotor 122 or that the second current is already being provided to the load 340.

According to embodiments, a method of operating a wind turbine includes, prior to providing the first current 410 to the generator rotor 122 and prior to providing the second current 420 to the load 340, determining 710 that the normal generator rotor current is already being provided to the generator rotor 122 or that the second current is already being provided to the load 340.

It may be understood that a controller(s), such as (one or more of) a load controller, blade heating system controller, converter controller, power conversion assembly controller, generator controller, turbine controller, and/or wind farm controller may be configured to determine 710 that the normal generator rotor current is already being provided to the generator rotor 122 or that the second current is already being provided to the load 340.

Figure 7:
FIG. 7 is a block diagram of a method of operating a wind turbine according to embodiments described herein.

FIG. 7 is a block diagram of a method of operating a wind turbine according to embodiments described herein. According to the embodiment seen in FIG. 7, a method of operating a wind turbine includes issuing a torque setpoint 810 for operating the wind turbine 100 at a tip speed ratio that is lower than an optimum tip speed ratio.

According to embodiments, the optimum tip speed ratio is a tip speed ratio for operating at one of a plurality of upper limit portions, or at a lowest upper limit portion of the plurality of upper limit portions. According to embodiments, the plurality of upper limit portions includes an upper limit portion of possible power production of the wind turbine 100 at the current wind speed, an upper limit portion of mechanical loading of the wind turbine 100 and an upper limit portion of acoustic noise generation for the wind turbine.

It may be understood that a controller(s), such as (one or more of) a turbine controller, converter controller, power conversion assembly controller, generator controller, and/or wind farm controller may be configured to issue a torque setpoint 810 for operating the wind turbine 100 at a tip speed ratio that is lower than an optimum tip speed ratio.

Figure 8:
FIG. 8 is a block diagram of a method of operating a wind turbine according to embodiments described herein.

FIG. 8 is a block diagram of a method of operating a wind turbine according to embodiments described herein. According to the embodiment seen in FIG. 8, a method of operating a wind turbine includes adjusting 910 the first current in inverse proportion to the second current.

It may be understood that a controller(s), such as (one or more of) a load controller, blade heating system controller, converter controller, power conversion assembly controller, generator controller, turbine controller, and/or wind farm controller may be configured to adjust 910 the first current in inverse proportion to the second current.

According to embodiments, a difference between the normal generator rotor current and the first current to the generator rotor 122 may be equal to or less than the rated current of the load 340. Accordingly, maximum current drawable by the load is made available within an upper current limit of the low voltage winding and effectiveness of the system is thereby improved.

According to embodiments, the load 340 includes a blade heating system 360. Accordingly, operation within an upper current limit of the low voltage winding is improved and effectiveness of the system is thereby improved.

Figure 9:
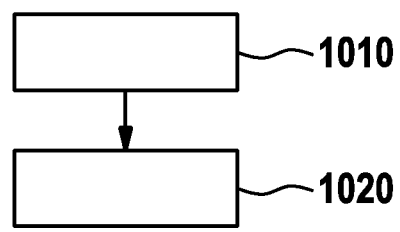
FIG. 9 is a block diagram of a method of operating a wind turbine according to embodiments described herein.

FIG. 9 is a block diagram of a method of operating a wind turbine according to embodiments described herein. According to the embodiment seen in FIG. 9, a method of operating a wind turbine includes receiving a third request 1010 to increase a supply of current to the load 340, and in response to receiving the third request, increasing an upper current limit 1020 of the low voltage winding 310.

In an example, the third request 1010 to increase the supply of current to the load 340 is based on a decrease in ambient temperature. In an example, the third request 1010 to increase the supply of current to the load 340 includes a first amount of increase, the first amount of increase being in proportion to an amount of decrease in ambient temperature.

In an example, the increase in the upper current limit 1020 of the low voltage winding 310 is based on a decrease in ambient temperature. In an example, the increase in the upper current limit 1020 of the low voltage winding 310 includes a second amount of increase, the second amount of increase being in proportion to an amount of decrease in ambient temperature.

It may be understood that a controller(s), such as (one or more of) a load controller, blade heating system controller, converter controller, power conversion assembly controller, generator controller, turbine controller, and/or wind farm controller may be configured to receive a third request 1010 to increase a supply of current to the load 340, and in response to receiving the third request, increasing an upper current limit 1020 of the low voltage winding 310.

It may be understood that the upper current limit of the low voltage winding 310 may be a pre-determined value or (adjustable) constant. In an example, the upper current limit of the low voltage winding 310 is (a value) stored in or for a controller(s), such as (one or more of) a load controller, blade heating system controller, converter controller, power conversion assembly controller, generator controller, turbine controller, and/or wind farm controller.

Further Methods

Figure 10:
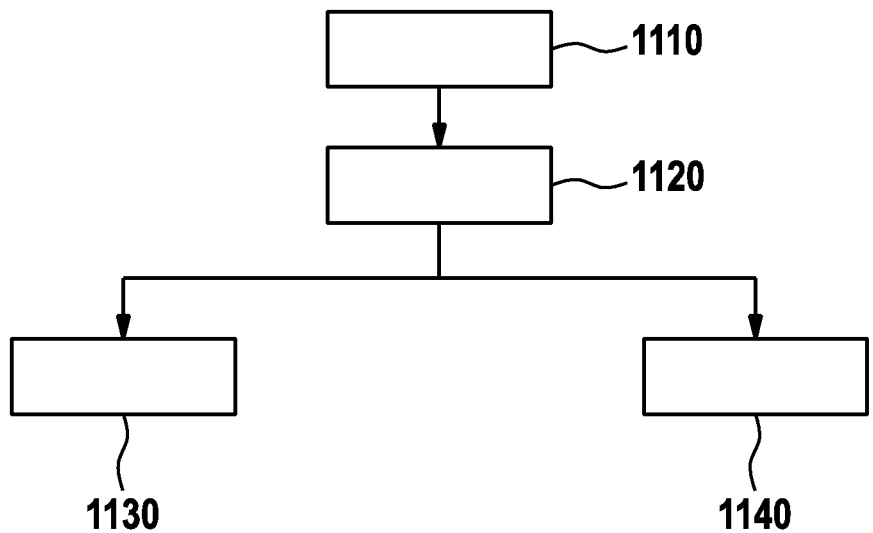
FIG. 10 is a block diagram of a method of operating a wind turbine according to embodiments described herein.

FIG. 10 is a block diagram of a method of operating a wind turbine according to aspects described herein. According to the aspect seen in FIG. 10, the method of operating a wind turbine includes, determining ice is on the blade 1110, determining a current wind speed 1120, when the determined current wind speed is less than a cut-in wind speed, providing, to the blade heating system, a current up to a rated current of the blade heating system 1130, and when the determined current wind speed is equal to or more than the cut-in wind speed and when the generator is at sub-synchronous speed, providing, to the blade heating system, a current up to a lower one of an unused current capacity of the low voltage winding and the rated current of the blade heating system 1140.

According to the aspect, the wind turbine 100 includes a blade 108, a blade heating system 360, a double-fed induction generator 118 having a generator stator 120 and a generator rotor 122, a power conversion assembly 210 including a rotor-side power converter 220 and a line-side power converter 222, and a load 340, wherein the generator rotor 122 is electrically coupled to the rotor-side power converter 220, wherein the line-side power converter 222 and the load 340 are electrically coupled to a grid 390 via a low voltage winding 310 of a transformer 234, and wherein a first sum of a rated current of the generator rotor 122 and a rated current of the load 340 is more than an upper current limit of the low voltage winding 310.

In an example, determining ice is on the blade 1110 includes determining based on measurements from one or more of vibrating probe, weight sensor, optical sensor, and/or capacitive sensor.

In an example, a controller(s), such as (one or more of) a load controller, blade heating system controller, turbine controller, and/or wind farm controller may be configured to determine ice is on the blade 1110. In an example, a controller(s), such as (one or more of) a turbine controller, generator controller, and/or wind farm controller may be configured to determine a current wind speed 1120.

In an example, a controller(s), such as (one or more of) a load controller, blade heating system controller, turbine controller, and/or wind farm controller may be configured, when the determined current wind speed is less than a cut-in wind speed, (to control the load 340 or the blade heating system 360) to draw a current, for the blade heating system 360, up to a rated current of the blade heating system 1130.

In an example, a controller(s), such as (one or more of) a load controller, blade heating system controller, turbine controller, and/or wind farm controller may be configured, when the determined current wind speed is equal to or more than the cut-in wind speed and when the generator is at sub-synchronous speed, (to control the load 340 or the blade heating system 360) to draw a current, for the blade heating system 360, up to a lower one of an unused current capacity of the low voltage winding and the rated current of the blade heating system 1140.

Figure 11:
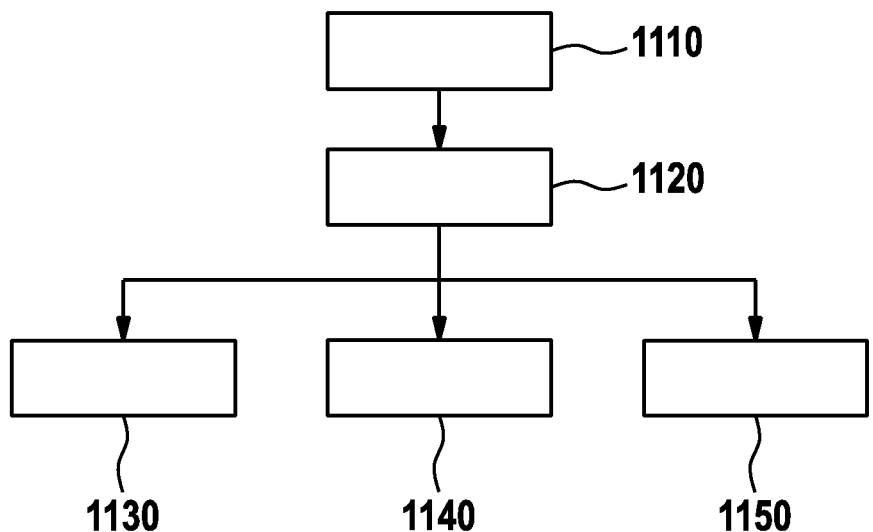
FIG. 11 is a block diagram of a method of operating a wind turbine according to embodiments described herein.

FIG. 11 is a block diagram of a method of operating a wind turbine according to embodiments described herein. According to the embodiment seen in FIG. 11, the method of operating a wind turbine includes, when the determined current wind speed is more than the cut-in wind speed and when the generator is substantially at synchronous speed, providing, to the blade heating system, a current up to the rated current of the blade heating system 1150.

In an example, a controller(s), such as (one or more of) a load controller, blade heating system controller, turbine controller, and/or wind farm controller may be configured, when the determined current wind speed is more than the cut-in wind speed and when the generator is substantially at synchronous speed, (to control the load 340 or the blade heating system 360) to draw a current, for the blade heating system 360, up to the rated current of the blade heating system 1150.

Figure 12:
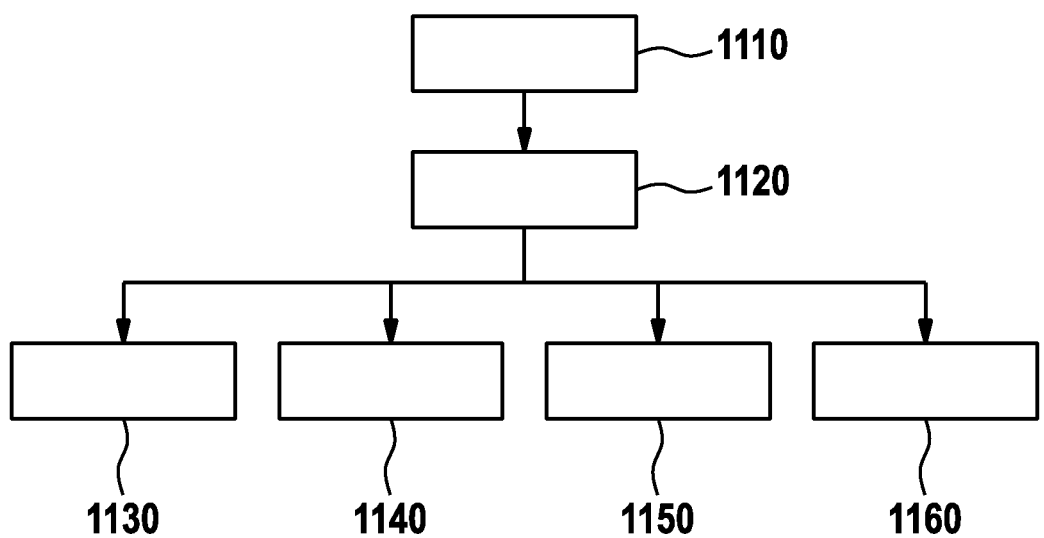
FIG. 12 is a block diagram of a method of operating a wind turbine according to embodiments described herein.

FIG. 12 is a block diagram of a method of operating a wind turbine according to embodiments described herein. According to the embodiment seen in FIG. 12, the method of operating a wind turbine includes, when the determined current wind speed is more than the cut-in wind speed and when the generator is at super-synchronous speed, providing, to the blade heating system, a current up to the rated current of the blade heating system 1160.

In an example, a controller(s), such as (one or more of) a load controller, blade heating system controller, turbine controller, and/or wind farm controller may be configured, when the determined current wind speed is more than the cut-in wind speed and when the generator is at super-synchronous speed, (to control the load 340 or the blade heating system 360) to draw a current, for the blade heating system 360, up to the rated current of the blade heating system 1160.

In an example, the expression 'substantially at synchronous speed' may be a generator speed range that includes synchronous speed, for which a distinct or particular or synchronous speed (generator/turbine) control strategy/scheme is applicable or in effect.

In an example, it may be understood that there may be at least a first control algorithm/scheme for operating the generator 'substantially at sub-synchronous speed'. In an example, it may be understood that there may be at least a second control algorithm/scheme for operating the generator 'substantially at synchronous speed'. In an example, it may be understood that there may be at least a third control algorithm/scheme for operating the generator 'substantially at super-synchronous speed'.

In an example, the expression 'substantially at synchronous speed' may be understood as within 5%, 2% or 1% of synchronous speed. In an example, the expression 'substantially at synchronous speed' may be understood as 'at synchronous speed'.

Accordingly, when a rated current of the generator rotor and of the load or blade heating system, which are electrically coupled to the same low voltage winding, is more than an upper current limit of the low voltage winding, power production is optimum. Further, the maximum rated current of the load or blade heating system is made (substantially or fully) available during substantially synchronous and super-synchronous speeds when the generator rotor is drawing small or no current.

Accordingly, operation within an upper current limit of the low voltage winding is improved and effectiveness of the system is thereby improved.

The term "stator side main transformer circuit breaker 380" may be used interchangeably with "first main transformer circuit breaker 380". The term "rotor side main transformer circuit breaker 320" may be used interchangeably with "second main transformer circuit breaker 320". The term "stator side system bus 384" may be used interchangeably with "first system bus 384". The term "rotor side system bus 324" may be used interchangeably with "second system bus 324". The term "low voltage winding 310" may be used interchangeably with "first low voltage winding 310". The term "second low voltage winding 370" may be used interchangeably with "further low voltage winding 370".

The present written description uses embodiments and examples to provide enabling disclosure. The scope of the present invention is defined by the claims.

The invention claimed is:

1. A method of operating a wind turbine, wherein the wind turbine includes:
   a double-fed induction generator having a generator stator and a generator rotor;
   a power conversion assembly including a rotor-side power converter and a line-side power converter;
   a load;
   the generator rotor electrically coupled to the rotor-side power converter;
   the line-side power converter and the load electrically coupled to a grid via a low-voltage winding of a transformer, the low-voltage winding having an upper current limit corresponding to a maximum current rating of the low-voltage winding;
   wherein a first sum of a rated current of the generator rotor and a rated current of the load is more than the upper current limit of the low-voltage winding;
   the method comprising:
   when operating the generator at a sub-synchronous speed, drawing a first current through the low-voltage winding and the power conversion assembly to the generator rotor, the first current being less than a normal generator rotor current setpoint, and
   drawing a second current through the low-voltage winding to the load, wherein a second sum of the first current and the second current is equal to or less than the upper current limit of the low-voltage winding.

2. The method according to claim 1, wherein the normal generator rotor current setpoint equals a generator rotor current for operating at one of a plurality of upper limit portions corresponding to one of: an upper limit portion of possible power production of the wind turbine at the current wind speed, an upper limit portion of mechanical loading of the wind turbine, or an upper limit portion of acoustic noise generation for the wind turbine.

3. The method according to claim 1, further comprising drawing a third current through the low-voltage winding, the third current including the first current and the second current and being within a range of 10% of the upper current limit of the low-voltage winding.

4. The method according to claim 1, further comprising, prior to drawing the first current and prior to drawing the second current, determining via a controller whether a setpoint for the first current at the normal generator rotor current or a setpoint for the second current would result in drawing a fourth current via the low-voltage winding that is more than the upper current limit of the low-voltage winding.

5. The method according to claim 1, further comprising, prior to drawing the first current and prior to drawing the second current, determining via a controller a value of an existing current being supplied to the generator rotor or a value of an existing current being supplied to the load.

6. The method according to claim 1, further comprising operating the wind turbine at a tip speed ratio that is lower than an optimum tip speed ratio, wherein the optimum tip speed ratio corresponds to operating at one of a plurality of upper limit portions selected from: an upper limit portion of possible power production of the wind turbine at the current wind speed, an upper limit portion of mechanical loading of the wind turbine, and or an upper limit portion of acoustic noise generation for the wind turbine.

7. The method according to claim 1, further comprising adjusting the first current in inverse proportion to the second current.

8. The method according to claim 1, wherein a difference between the normal generator rotor current and the first current to the generator rotor is equal to or less than a rated current of the load.

9. The method according to claim 1, wherein the load includes a blade heating system.

10. The method according to claim 9, further comprising receiving a request to increase a supply of current to the load, and in response to receiving the request, increasing the upper current limit of the low-voltage winding.

11. A computer-readable storage medium comprising instructions which, when executed by a computer, cause the computer to carry out the method according to claim 1.

12. A method of operating a wind turbine, wherein the wind turbine includes:
   a blade;
   a blade heating system;
   a double-fed induction generator having a generator stator and a generator rotor;
   a power conversion assembly including a rotor-side power converter and a line-side power converter;
   the generator rotor electrically coupled to the rotor-side power converter;
   the line-side power converter and the blade heating system electrically coupled to a grid via a low-voltage winding of a transformer, the low-voltage winding having an upper current limit corresponding to a maximum current rating of the low-voltage winding;
   wherein a first sum of a rated current of the generator rotor and a rated current of the blade heating system is more than the upper current limit of the low-voltage winding;
   the method comprising:
   determining ice is on the blade;
   determining a current wind speed;
   when the determined current wind speed is less than a cut-in wind speed, drawing a current through the low-voltage winding to the blade heating system up to a rated current of the blade heating system; and
   when the determined current wind speed is equal to or more than the cut-in wind speed and the generator is at sub-synchronous speed, drawing a current through the low-voltage winding to the blade heating system up to a lower one of an unused current capacity of the low-voltage winding or the rated current of the blade heating system.

13. The method according to claim 12, further comprising, when the determined current wind speed is more than the cut-in wind speed and when the generator is within a range of 5% of synchronous speed, drawing the current through the low-voltage winding to the blade heating system up to the rated current of the blade heating system.

14. The method according to claim 12, further comprising, when the determined current wind speed is more than the cut-in wind speed and when the generator is at super-synchronous speed, drawing the current through the low-voltage winding to the blade heating system up to the rated current of the blade heating system.

15. A wind turbine, comprising:
- a blade;
- a double-fed induction generator including a generator stator and a generator rotor;
- a power conversion assembly including a rotor-side power converter and a line-side power converter;
- a load;
- a controller;
- the generator rotor electrically coupled to the rotor-side power converter;
- the line-side power converter and the load electrically coupled to a grid via a low voltage winding of a transformer, the low-voltage winding having an upper current limit corresponding to a maximum current rating of the low-voltage winding;
- wherein a first sum of a rated current of the generator rotor and a rated current of the load is more than the upper current limit of the low-voltage winding; and
- wherein the controller is configured to perform the following:
  - when the generator is at sub-synchronous speed, draw a first current through the low-voltage winding and the rotor-side power converter to the generator rotor, the first current being less than a normal generator rotor current; and
  - draw a second current through the low-voltage winding to the load, wherein a second sum of the first current and the second current is equal to or less than the upper current limit of the low-voltage winding.

* * * * *